United States Patent [19]
Capitant et al.

[11] Patent Number: 5,467,412
[45] Date of Patent: Nov. 14, 1995

[54] CORRECTING DIGITIZED SIGNALS TO ACHIEVE SPECIFIED OUTPUT RESULTS FOR AN IMAGE

[75] Inventors: Patrice J. Capitant, Los Altos; David C. Collier, Gilroy, both of Calif.

[73] Assignee: Sony Electronics, Inc., Park Ridge, N.J.

[21] Appl. No.: 285,642

[22] Filed: Aug. 2, 1994

Related U.S. Application Data

[63] Continuation of Ser. No. 846,675, Mar. 5, 1992, abandoned.

[51] Int. Cl.$^6$ .................................................... G06T 5/00
[52] U.S. Cl. ........................ 382/167; 382/254; 348/97; 358/518
[58] Field of Search ..................... 382/41, 54, 57, 382/17, 167, 254; 358/518, 519, 520, 527, 530; 348/453, 708, 97, 96, 577, 520, 104

[56] References Cited

U.S. PATENT DOCUMENTS

| | | | |
|---|---|---|---|
| 4,736,244 | 4/1988 | Shiota et al. | 358/76 |
| 4,901,063 | 2/1990 | Kimura et al. | 382/57 |
| 4,941,039 | 7/1990 | D'Errico | 358/80 |
| 4,974,072 | 11/1990 | Hasegawa | 358/80 |
| 5,155,586 | 10/1992 | Levy et al. | 358/27 |
| 5,166,783 | 11/1992 | Hodgson | 348/104 |
| 5,181,100 | 1/1993 | Hodgson | 358/37 |
| 5,185,666 | 2/1993 | Capitant et al. | 358/22 |
| 5,189,521 | 2/1993 | Ohtsubo et al. | 358/80 |
| 5,218,299 | 6/1993 | Dunkel | 324/307 |

OTHER PUBLICATIONS

Kumar et al. "A Non–linear Optimization Algorithm for the Estimation of Structure and Motion Parameters" Proceedings CVPR '89 pp. 136–143, Jun. 1989.

Lee et al., *A New Method For the Design of Two–Dimensional Recursive Digital Filters*, IEEE Transactions on Acoustics, Speech, and Signal Processing, Apr. 1988, vol. 36 No. 4 pp. 589–598.

*Primary Examiner*—Michael T. Raeavi
*Assistant Examiner*—Jon Chang
*Attorney, Agent, or Firm*—Irell & Manella

[57] ABSTRACT

An operator input subsystem and an image signal processing subsystem are provided to a digital image processing system. The operator input subsystem comprises a CPU, a display device and an input device, whereas the image signal processing subsystem comprises a digital signal processor having a number of digitized signal correctors. For cases where the output results are expressible as smoothly differentiable continuous functions of the digitized input signal values and the processing parameters, the CPU receives the specified output results from the input device and the digitized input signal values and the current processing parameters from the digitized signal correctors. In response, the CPU determines the most optimal processing parameters for the digitized signal correctors to achieve the specified output results. The CPU provides the determined optimal processing parameters to the digitized signal correctors, which in turn use the parameters to correct the digitized signals. The CPU makes the determination by performing a standard non-linear optimization of the smoothly differentiable continuous function. As a result, the increasingly difficult task of providing processing parameters to the image signal correctors is done automatically for the operator, thereby making the image processing system more efficient and user friendly.

18 Claims, 6 Drawing Sheets

CORRECTING DIGITIZED SIGNALS TO ACHIEVE SPECIFIED OUTPUT RESULTS FOR AN IMAGE

This is a continuation of application Ser. No. 07/846,675 filed Mar. 5, 1992, now abandoned.

BACKGROUND OF THE INVENTION

1. Field of the Invention:

The present invention relates to the field of digital image processing systems, in particular, digitized image signal correctors on these systems. More specifically, the present invention relates to correcting digitized signals by these digitized image signal correctors to achieve specified output results of an image.

Copending Applications

Various non-essential aspects of the digital image processing system incorporating the teachings of the present invention are described in further detail in the following U.S. patent applications, assigned to the assignee of the present invention, Sony Corporation of America, Park Ridge, N.J.:

Ser. No. 07/741,329, filed on Aug. 7 1991, entitled Non-Real-Time Film Scanning System now U.S. Pat. No. 5,321,500.

Ser. No. 07/736,006, filed on Jul. 25, 1991, entitled Digital Video Processing System With Mixing Prefilter (now issued as U,S. Pat. No. 5,181,100);

Ser. No. 07/746,928, filed on Aug. 19, 1991, entitled Method and Apparatus for Flare Correction (now issued as U.S. Pat. No. 5,155,586);

Ser. No. 07/740,626, filed on Aug. 5, 1991, entitled Digitized Film Image Processing System With Bordered Split Screen Display (now issued as U.S. Pat. No. 5,185,666).

Ser. No. 07/660,662, filed on Feb. 25, 1991, entitled Digital Signal Processing System Employing Icon Display now U.S. Pat. No. 5,191,645

Ser. No. 07/794,489, filed on mm/dd/yy, entitled Computerized Interactive Menu-Driven Video Signal Processing Apparatus and Method now U.S. Pat. No. 5,412,773 ;

Ser. No. 07/710,704, filed on Jun. 5, 1991, entitled Digital Color Correction System and Method now U.S. Pat. No. 5,255,083;

Ser. No. 07/740,623, filed on Aug. 5, 1991, entitled Digital Video Color Processor With Anti-Aliasing now U.S. Pat. No. 5,166,783; and, Ser. No. 07/687,962, filed on Apr. 19, 1991, entitled Digital Color Correction System Having Gross and Fine Adjustment Modes now abandoned.

2. Background

In image processing, image signals typically undergo various adjustments or corrections. For example, in film to video conversion for high definition television (HDTV), these adjustments and corrections include:

a) correction of calorimetric distortions due to film dye cross-talk, b) correction of the non-linear luminance transfer function of the film, c) correction for distortion due to video cross-talk, d) conversion of linear data into the Society of Motion Picture and Television Engineer (SMPTE) 240M representation.

Additionally, in the exemplary film to video conversion for high definition television (HDTV) application, an operator may want to:

a) adjust the color of a film derived image to match that of a video derived image for seamless intercuts, b) remove localized noise, or c) process layered film mattes for smooth composition.

In most image processing systems, the digitized image signal correctors perform the adjustments or corrections based on the processing parameters provided by the operators. The task of selecting the appropriate processing parameters for these digitized image signal correctors to achieve certain desired output results is normally left to the operator and is one of the more difficult tasks in image processing. As the complexity of the image processing model grows with advances in image processing technology, this task has become even more difficult. For example, in the exemplary film to video conversion for HDTV application, an operator may be required to provide input gain and offset processing parameters, interimage masking processing parameters, film characteristic processing parameters, and video cross-talk processing parameters to the color corrector for color correction.

In most if not all adjustments or corrections, the operator typically does not want to know about the particular processing parameters being used, he/she simply wants to achieve the desired output results. Thus, it is desirable to be able to automatically determine the optimal processing parameters for digitized image signal correctors on an image processing system to correct digitized signals to achieve specified output results for an image.

As will be disclosed, the present invention provides for a method and apparatus for correcting digitized signals to achieve specified output results of an image where the optimal processing parameters used by the digitized signal correctors are automatically determined.

SUMMARY OF THE INVENTION

A method and apparatus for correcting digitized signals on a digital image system to achieve specified output results of an image is disclosed. The optimal processing parameters used by the digitized signal correctors of the digital processing system to achieve the specified output results of an image are automatically determined. The method and apparatus of the present invention has particular application to digitized image signal adjustment or correction in image processing where the desired outputs are expressible as smoothly differentiable functions of the digitized input image signal values and the processing parameters, for example, as in film to video image color correction.

Under the presently preferred embodiment, an operator input subsystem comprising a processor, a display device, and an input device, is provided to a digital image processing system. An image signal processing subsystem comprising a digitized signal processor having a number of digitized signal correctors is also provided to the digital image processing system. The operator input subsystem and the image signal processing subsystem are coupled to each other.

For those cases where the desired outputs are expressible as smoothly differentiable functions of the digitized input image signal values and the processing parameters, the processor generates and displays reference output results on the display device for an operator's selection using the input device. In addition, the processor receives the digitized input signal values and the current processing parameters of the digitized signal correctors from the image signal processing subsystem.

In response to a set of output selections and a set of input and current processing parameters from a digitized image signal corrector, the processor determines a new set of optimal processing parameters for the digitized image signal corrector using a standard non-linear optimization method. Upon their determination, the newly determined optimal processing parameters are provided by the processor to the digitized image signal corrector. The digitized image signal corrector uses the optimal processing parameters to correct the digitized signals to achieve the specified output results for the image.

The presently preferred standard non-linear optimization method is the Levenberg-Marquardt method. The new optimal processing parameters are determined by repeatedly solving for the delta improvement of the processing parameters until the delta improvement falls below a predetermined threshold.

BRIEF DESCRIPTION OF THE DRAWINGS

The objects, features, and advantages of the present invention will be apparent from the following detailed description of the preferred embodiment of the invention with references to the drawings in which.

NOTATIONS AND NOMENCLATURE

Figure 1:
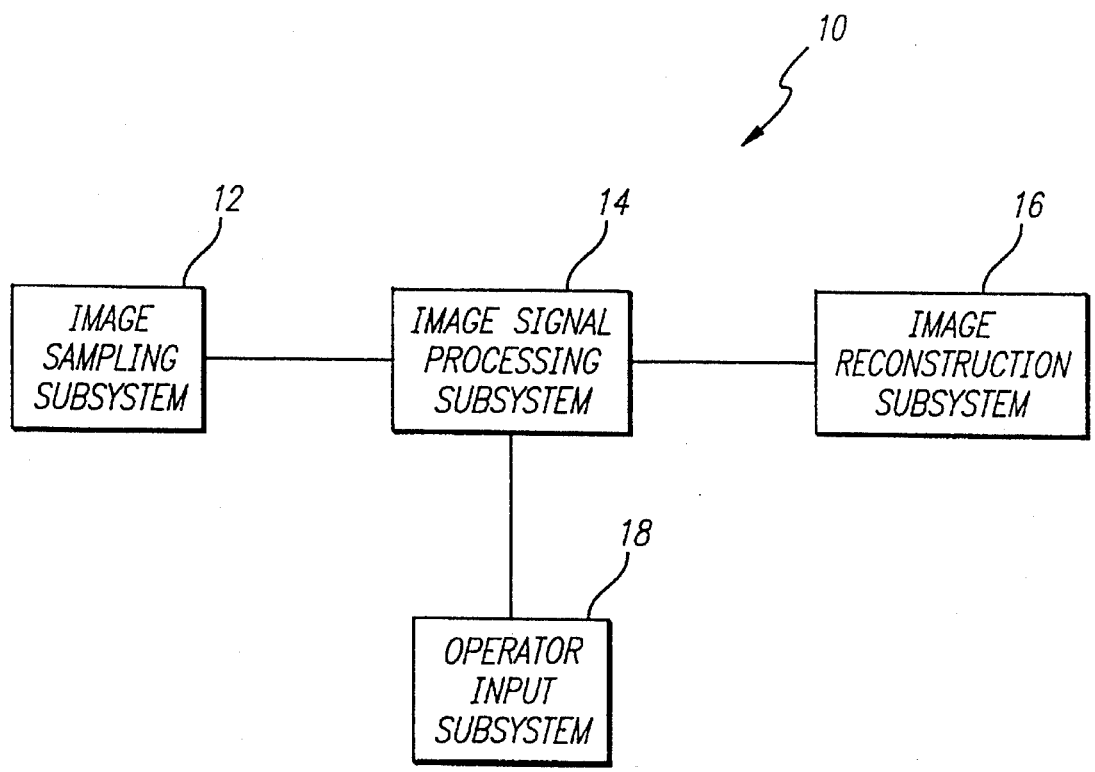
FIG. 1 shows a logical view of a digital image processing system that incorporates the teachings of the present invention.

The detailed description which follows is presented largely in terms of program procedures executed on computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE PREFERRED EMBODIMENT

A method and apparatus for correcting digitized signals on a digital image processing system is disclosed. The optimal processing parameters used by the digitized image signal correctors of the image processing system to achieve the specified output results are automatically determined. The method and apparatus of the present invention has particular application to digitized image signal adjustment or correction in image processing where the desired outputs are expressible as smoothly differentiable functions of the digitized input image signal values and the processing parameters, for example, as in film to video image color correction.

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring now to FIG. 1, a block diagram illustrating a digital image processing system that incorporates the teachings of the present invention is shown. Shown is an image sampling subsystem 12 that outputs to an image signal processing subsystem 14. The image sampling subsystem 12 is used for sampling physical images to generate analog spatial samples for the images. The image sampling subsystem 12 is intended to represent a broad category of image sampling devices which are well known in the art and will not be described further.

The image signal processing subsystem 14 takes the outputs of the image sampling subsystem 12 as inputs and in turn outputs to the image reconstruction subsystem 16. The image signal processing subsystem 14 performs quantization to convert the analog samples into discrete samples, transforms including signal adjustments and corrections, dequantization, and inverse transforms. The image signal processing subsystem 14 will be described in further detail later with reference to FIG. 2.

The image reconstruction subsystem 16 takes the outputs of the image signal processing subsystem 14 as inputs, and in turn outputs the images. The image reconstruction subsystem 16 is also intended to represent a broad category of image reconstructors, including raster displays and HDTV monitors, which are also well known in the art and will not be described further.

The image processing system 10 interacts with the operator through the operator input subsystem 18. The operator provides various commands, processing parameter inputs to the other subsystems 12, 14 and 16 through the operator input subsystem 18. The operator input subsystem 18 will be described in further detail later with reference to FIG. 3.

Particular examples of image processing systems that can incorporate the teachings of the present invention are the film to video conversion image processing systems described in the above identified copending applications entitled Non-Real-Time Film Scanning System, Digital Video Processing System With Mixing Prefilter, Method and Apparatus for Flare Correction, and Digitized Film Image Processing System With Bordered Split Screen Display.

Figure 2:
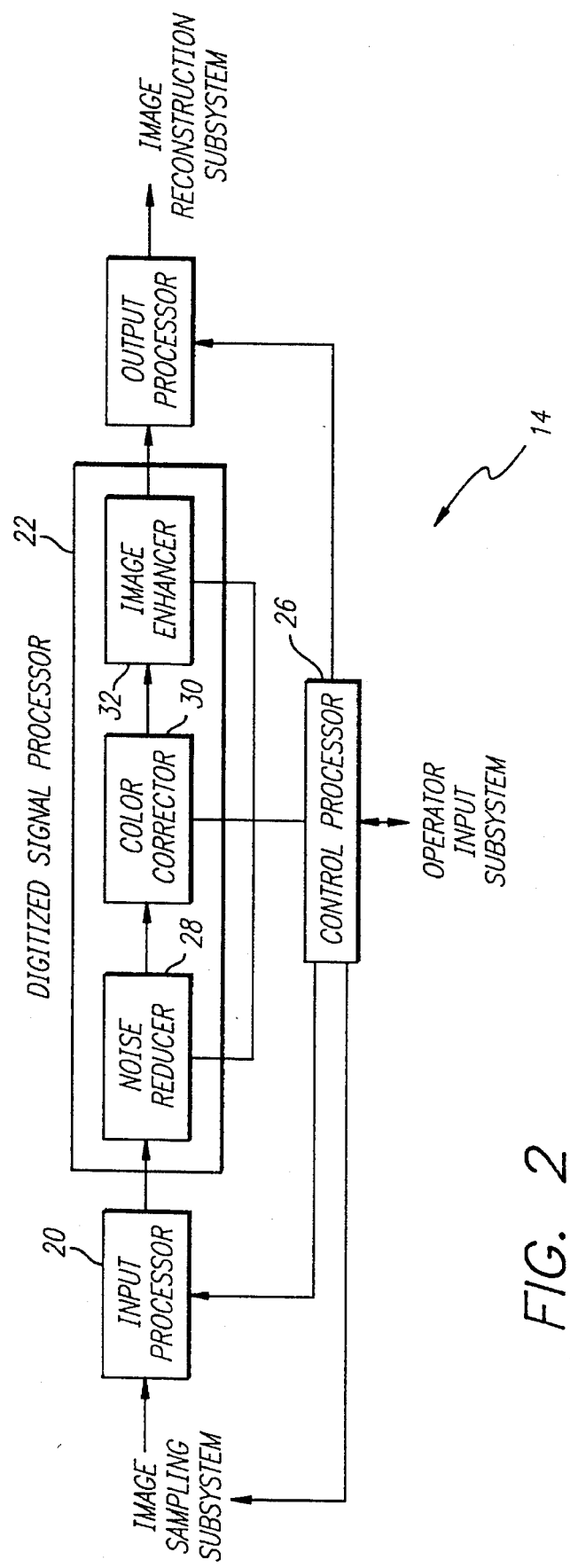
FIG. 2 shows a logical view of the image signal processing subsystem of the digital image processing system illustrated in FIG. 1.

Referring now to FIG. 2, a block diagram illustrating the image signal processing subsystem of the image processing system illustrated in FIG. 1 is shown. Shown is an input processor 20 for receiving the analog outputs from the image sampling subsystem, digitizing the analog input, performing preliminary corrections on the resulting digitized signals, and supplying the digitized signals to the digitized signal processor 22. The input processor 20 is intended to represent a broad category of analog to digital input processor whose functions and constitutions are well known and will not be described further.

The digitized signal processor 22 takes the digitized outputs of the input processor 20 as inputs and in turn outputs to the output processor 24. The digitized signal processor 22 performs various transforms including signal adjustments and corrections. In particular, the digitized signal processor 22 comprises a noise reducer 28 for performing local noise reduction, a color corrector 30 for performing colorimetric corrections, and an image enhancer 32 for enhancing the images being processed. It will be appreciated that the digitized signal processor 22 may comprise other circuitry for performing other transforms. The digitized signal processor 22 and its noise reducer 28, color corrector 30 and image enhancer 32 are intended to represent a broad category of digitized signal processors and their noise reducers, color correctors and image enhancers whose functions and constitutions are well known and will not be described further.

The output processor 24 receives the digitized output signals from the digitized signal processor 22, performs various post-processing on the digitized signals, such as data compression, and outputs the post-processed digitized signals to the image reconstruction subsystem. The output processor 24 is intended to represent a broad category of digital signal post-processing output processors whose functions and constitutions are well known and will not be described further.

The image signal processing subsystem 14 operates under the control of the control processor 26. The control processor 26 receives control commands and processing parameters for the image processing system from the operator through the operator input subsystem. The control processor 26 also provides feedback to the operator through the operator input subsystem. Additionally, for cases where the desired output results are expressible as smoothly differentiable continuous functions of the digitized input signal values and the processing parameters, that is, $S_{out}=F(S_{in},P)$, where $S_{out}$ and $S_{in}$ are output and input signals respectively, $F()$ is a smoothly differentiable continuous function, and $P=(P0, P1,\ldots, Pn)$ are the current processing parameters, the control processor 26 cooperates with the operator input subsystem in automatically determining processing parameters for the digitized signal correctors. A particular example where the output signal can be so represented is film to video colorimetrics correction. Application of the present invention to film to video colorimetrics correction will be described in further detail later with reference to FIGS. 5a–5g. Except for this cooperation between the control processor 26 and the operator input subsystem, the control processor 26 is intended to represent a broad category of control processors of image signal processing subsystems whose basic functions and constitutions are well known and will not otherwise be described further.

For those cases where the desired output results can be expressed as a smoothly differentiable continuous function of the digitized input signal and the processing parameters, the control processor 26 provides the digitized input signal values and the current processing parameters of a digitized signal corrector to the operator input subsystem for automatic determination of the most optimal processing parameters to achieve a specified output result. Upon receipt of the new optimal processing parameters, the control processor 26 updates the processing parameters used by the digitized signal corrector. How the operator input subsystem uses the digitized input signal values and the current processing parameters to automatically determine the optimal processing parameters to achieved a desired output result will be described in further detail later with reference to FIGS. 4a–4b.

Particular examples of image signal processing subsystems that can incorporate the teachings of the present invention are the image signal processing subsystems of the film to video conversion image processing systems described in the above identified copending applications entitled Non-Real-Time Film Scanning System, Digital Video Processing System With Mixing Prefilter, Method and Apparatus for Flare Correction, and Digitized Film Image Processing System With Bordered Split Screen Display.

Particular examples of digitized signal correctors that can operate with their processing parameters automatically determined in accordance to the teachings of the present invention are the color correctors of the film to video conversion image processing systems described in the above identified copending applications entitled; Non-Real-Time Film Scanning System, Digital Video Processing System With Mixing Prefilter, Method and Apparatus for Flare Correction, Digitized Film Image Processing System With Bordered Split Screen Display: Digital Color Correction System and Method, Digital Video Color Processor With Anti-Aliasing; and Digital Color Correction System Having Gross and Fine Adjustment Modes.

Figure 3:
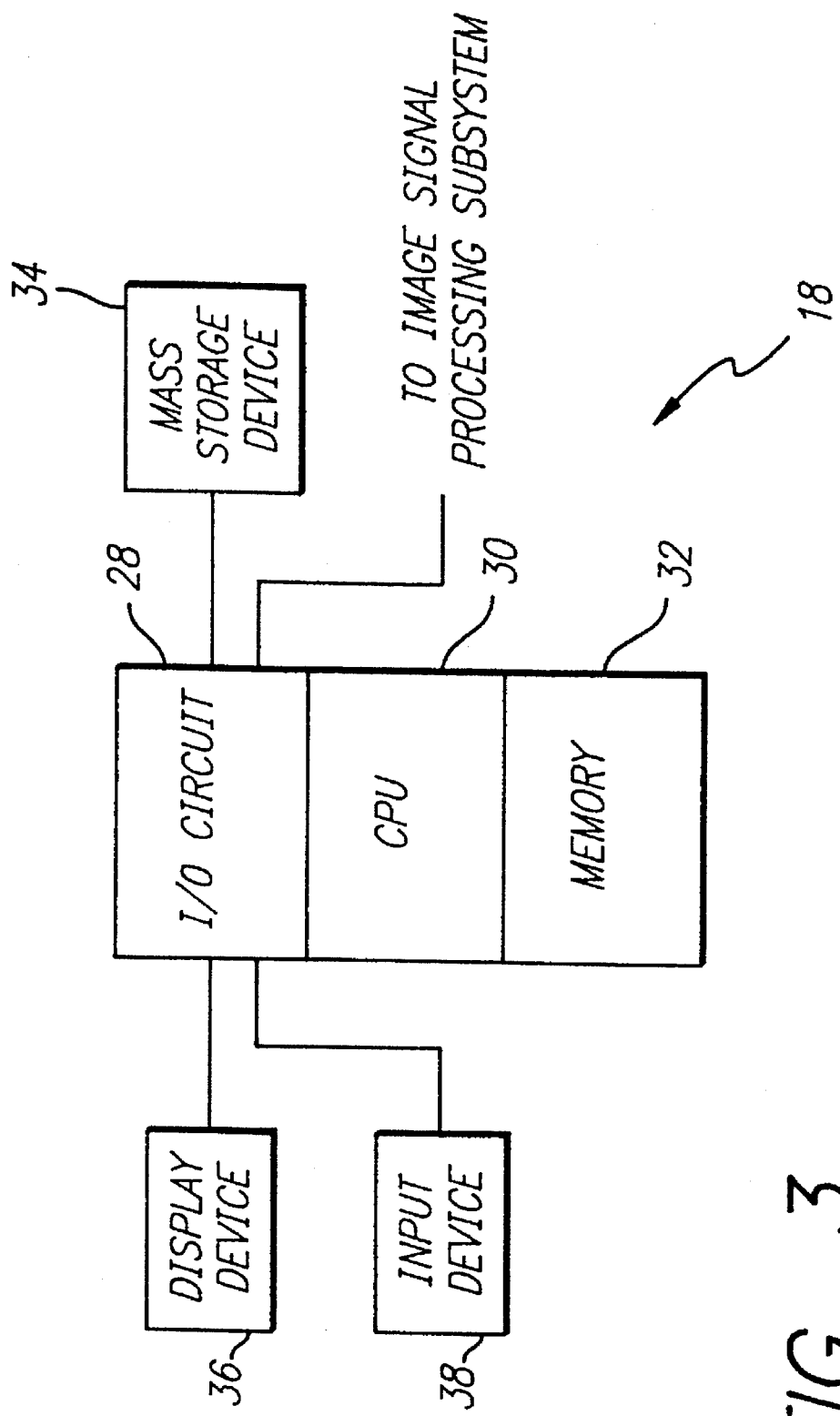
FIG. 3 shows a logical view of the operator input subsystem of the digital image processing system illustrated in FIG. 1.

Referring now to FIG. 3, a block diagram illustrating the operator input subsystem of the digital image processing system illustrated in FIG. 1 is shown. Shown is an input/output (I/O) circuit 28 coupled to a central processing unit (CPU) 30, a mass storage device 34, a display device 36 and an input device 38. The I/O circuit 28 is used to communicate information in appropriately structured form to and from the CPU 30 and the mass storage device 34, the display device 36, and the input device 38. The I/O circuit 28 is intended to represent a broad category of I/O circuits whose functions and constitutions are well known in the art and will not be described further.

The CPU 30, in addition to being coupled to the I/O circuit 28, is also coupled to a memory 32. The CPU 30 is used to receive input of operator commands, processing parameters and the like for the image signal processing subsystem from the input device 38. The CPU 30 is also used to provide operator feedback through the display device 36. Additionally, for cases where the desired output results are expressible as smooth differentiable continuous functions of the digitized input signal values and the processing parameters, the CPU cooperates with the image signal processing subsystem in automatically determining processing parameters for the digitized signal correctors of the image signal processing subsystem. Except for this cooperation between the CPU 30 and the image signal processing subsystem, the CPU 30 is intended to represent a broad category of CPUs whose basic functions and constitutions are well known and will not otherwise be described further.

For those cases where the desired output results are expressible as smoothly differentiable continuous functions of the digitized input signal values and the processing parameters, the CPU 30 receives the desired output results from the input device 38, and the digitized input signal values and the current processing parameters of the digitized signal correctors from the control processor of the image signal processing subsystem. In response, the CPU 30 determines the most optimal processing parameters to achieve the specified output results. Upon determination, the CPU 30 provides the new optimal processing parameters to the control processor of the image signal processing subsystem. How the operator input subsystem uses the digitized input signal values and the current processing parameters to automatically determine the optimal processing parameters to achieve the desired output results will be described in further detail later with reference to FIGS. 4a–4b.

Continuing to refer to FIG. 3, the memory 32 is used for storing programs executed by the CPU 30 and data of the executing programs. The memory 32 is intended to represent a broad category of memory whose functions and constitutions are well known and will not be described further.

The mass storage device 34 is used to provide auxiliary storage for the executing programs and their data. The mass storage device 34 is also intended to represent a broad category of mass storage devices whose functions and constitutions are well known and will not be described further.

The display device 36, as described earlier, is used to provide feedback to the operator. In particular, the display device 36 is used to provide reference image output results for the operator to select and specify his/her desired output results. The display device 36 is intended to represent a broad category of visual display device including raster displays and HDTV monitors whose functions and constitutions are well known and will not be described further.

The input device 38, as described earlier, is used to provide operator commands and processing parameters to the image signal processing subsystem. In particular, the input device 38 is used to specify the desired output result for the CPU 30 by selecting the reference output. The input device 38 is intended to represent a broad category of input devices including keyboards and cursor control devices whose functions and constitutions are well known and will not be described further.

Particular examples of operator input subsystems that can incorporate the teachings of the present invention are the operator input subsystems of the film to video conversion image processing systems described in the above identified copending applications entitled Non-Real Time Film Scanning System, Digital Video Processing System With Mixing Prefilter, Method and Apparatus for Flare Correction, Digitized Film Image Processing System With Bordered split Screen Display, Digital Signal Processing System Employing Icon Display, and Computerized Interactive Menu-Driven Video Signal Processing Apparatus and Method.

Figure 4A:
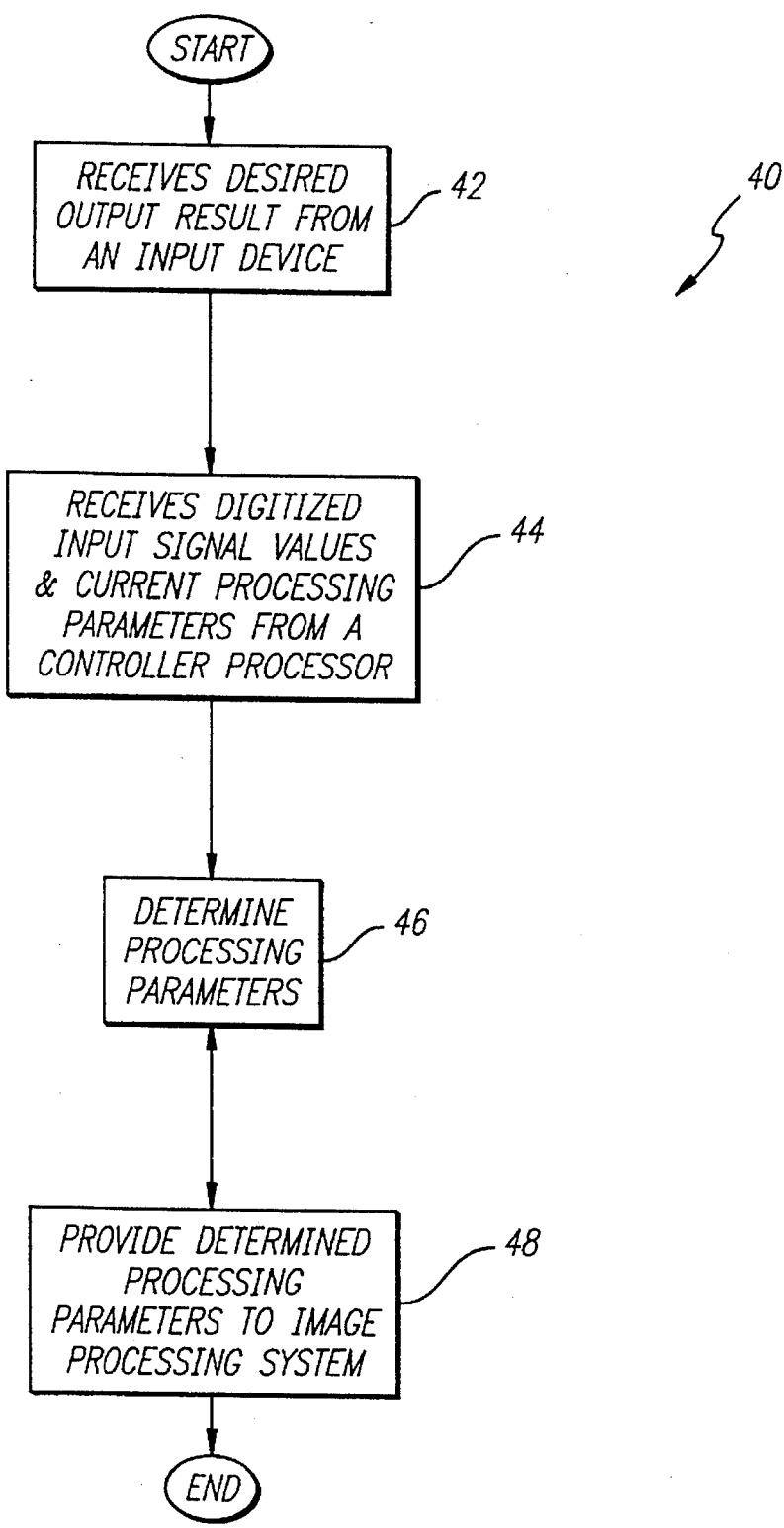
FIGS. 4a–4b are flow charts illustrating the method of the present invention.
Figure 4B:
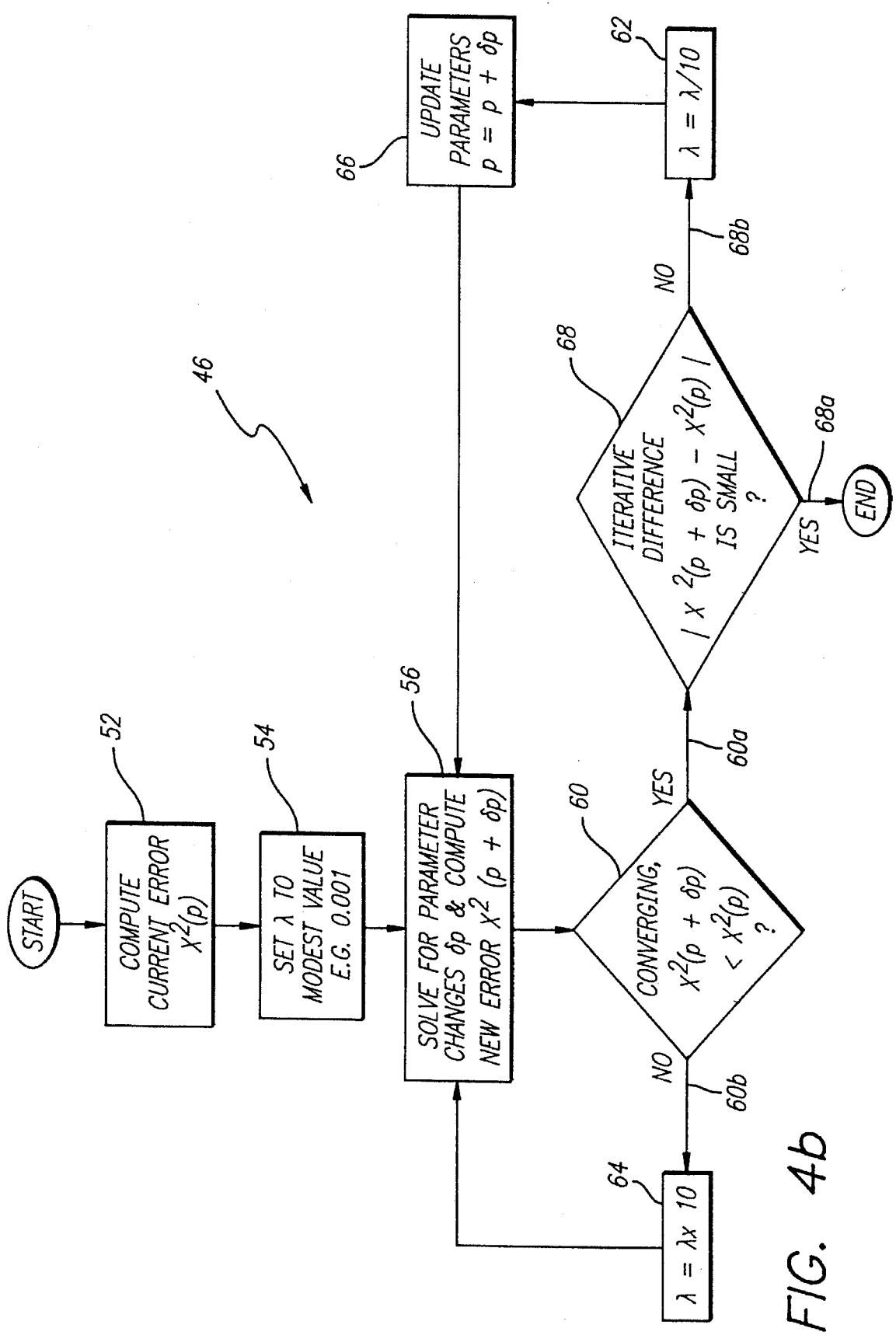

Referring now to FIGS. 4a–4b, two block diagrams illustrating the method of the present invention used by the CPU of the operator input subsystem to automatically determine processing parameters for a digitized signal corrector of the image signal processing subsystem to achieve a specified output result are shown. As shown in FIG. 4a, where the desired output results are expressible as a smoothly differentiable continuous function of the digitized input signal values and the processing parameters, the CPU receives the desired output result from the input device, block 42. Preferably, the desired output result is specified by selecting from a number of reference output results provided to the operator.

Additionally, the CPU receives the digitized input signal values and the current processing parameters of the digitized signal corrector from the image signal processing subsystem, block 44. Preferably, the digitized input signal values are provided by a controller processor of the image signal processing subsystem based on the digitized input signals received by the digitized signal corrector.

In response, the CPU determines the optimal processing parameters for the digitized signal corrector, block 46. The CPU makes the determination by performing a standard non-linear optimization on the function that represents the output results in terms of the digitized input signal values and the processing parameters. The presently preferred standard non-linear optimization method is the Levenberg-Marquardt method which is illustrated in FIG. 4b.

As shown in FIG. 4b, initially the current error $\chi^2(p)$ is computed, block 52. The current error $\chi^2(p)$ is computed as follows:

$$\chi^2(p) = \sum_{i=0}^{n} \delta_{out}(i) - F(\delta_{in}(i),p)^2$$

Additionally, the step constant $\lambda$ is set to a modest value, e.g., 0.001, block 54.

Then the processing parameter changes ($\delta p$) and the new error $\chi^2(p+\delta p)$ are computed, block 56. The processing parameter changes ($\delta p$) are computed by solving the following equation:

$$A \times \delta p = \beta$$

where $$A = [\alpha_{kl}]$$

$$\alpha_{kl} = (1 + \lambda \delta_{kl}) \sum_{in} \sum_{i=o}^{n} \frac{\partial F(s_{in}(i); P_{cur})}{\partial p_k} \frac{\partial F(s_{in}(i); P_{cur})}{\partial p_l}$$

-continued $$\delta_{kl} = \begin{cases} 0 & k \neq l \\ 1 & k = l \end{cases}$$

and $$\beta_k = \sum_{in} \sum_{i=0}^{n} [\delta_{out}(i) - F(\delta_{in}(i), P_{cur})] \frac{\partial F(\delta_{in}(i), P_{cur})}{\partial p_k}$$

with $P_{cur}$ stands for the current values of the processing parameters.

The new error $\chi^2(p + \delta p)$ is computed in a similar manner as $\chi^2(p)$.

The newly computed error $\chi^2(p+\delta p)$ is then checked against the previously computed error $\chi^2(p)$ to determine if the error is converging, block 60. That is, whether $\chi^2(p+\delta p)$ is less than $\chi^2(p)$. If the error is converging, branch 60a, the absolute value of the converged difference, that is $|\chi^2(p+\delta p) - \chi^2(p)|$, is checked against a predetermined convergence threshold to determine if the error difference is insignificant, block 68.

If the error is increasing, branch 60b, the step constant $\lambda$ is increased by ten times, block 64. The processing parameter changes ($\delta p$) and the new error $\chi^2(p+\delta p)$ are recomputed, block 56 and the convergence is rechecked, block 60 and conditionally block 68, as described above.

If the error is converging, branch 60a, and the error difference is not insignificant, branch 68b, the step constant $\lambda$ is decreased by ten times, block 62, and the parameter changes ($\delta p$) are added to the parameters (p), block 66.

If the error is converging, branch 60a, and the error difference is insignificant, branch 68a, the optimal processing parameters (p) are found.

Referring back to FIG. 4a, upon determining the optimal processing parameters, the CPU of the operator input subsystem provides them to the digitized signal corrector of the image signal processing subsystem, block 48. Preferably, the optimal processing parameters are provided to a controller processor of the image signal processing subsystem, which in turn updates the processing parameters used by the particular digitized signal corrector. The digitized signal corrector then uses the optimal processing parameters to correct the digitized signals to achieve the specified output results for the image.

Figure 5:
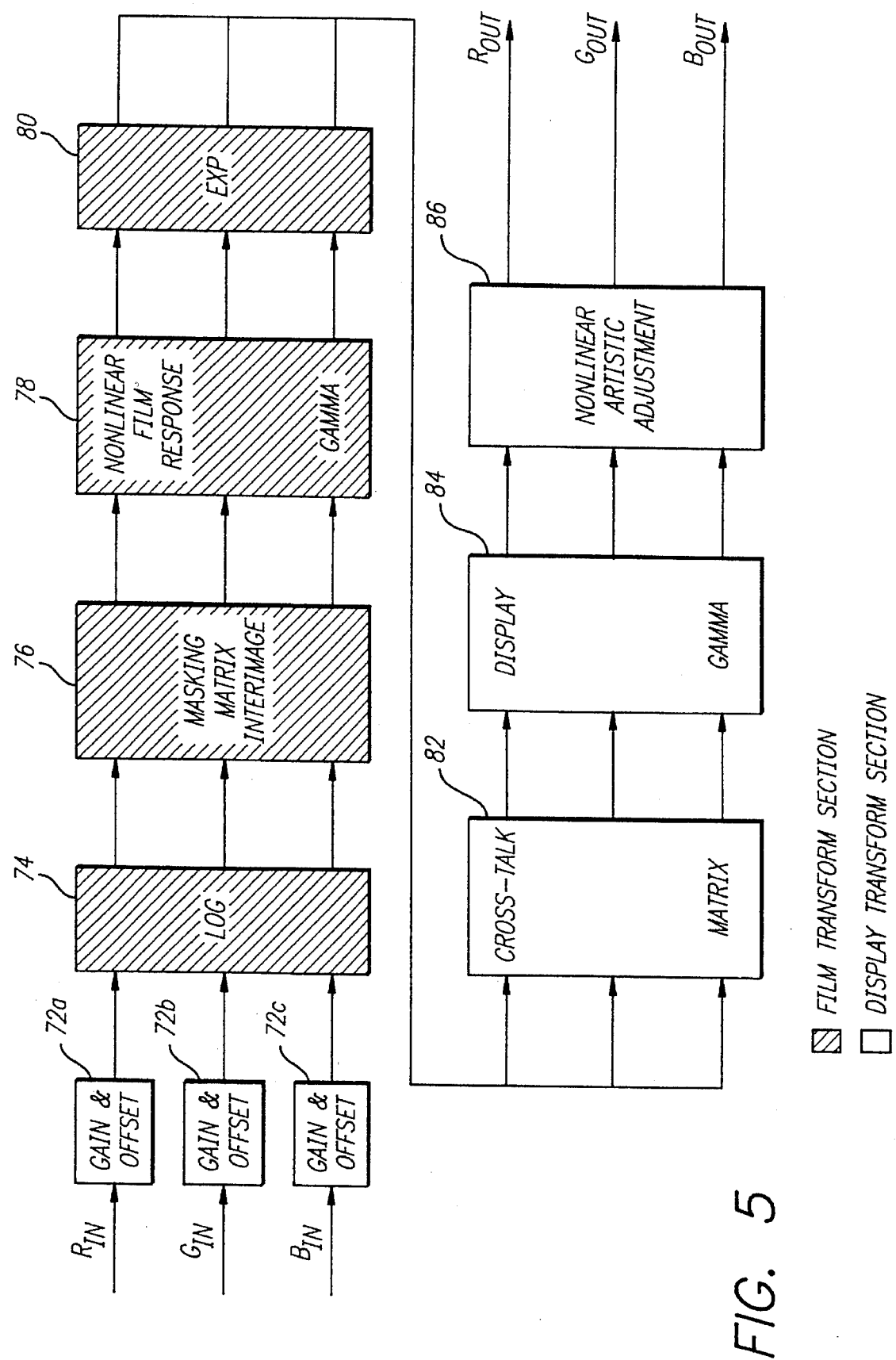
FIG. 5 illustrate application of the present invention to colorimetric correction in a film to video conversion digital image processing system.

Referring now to FIG. 5 and Appendices A and B, various diagrams illustrating application of the present invention to color correction in an exemplary film to video conversion digital image processing system are shown. The overall operations and processing flow of an exemplary color corrector in the exemplary film to video conversion digital image processing system are shown in FIG. 5. The digitized Red, Blue, and Green input signals ($r_{in}$, $b_{in}$, $g_{in}$) received from the image sampling subsystem first go through gain and offset adjustments, blocks 72a–72c. The adjusted digitized Red, Blue, and Green signals ($r_{in}$, $b_{in}$, $g_{in}$) then go through a series of film related transforms, logarithmic, interimage masking, film characteristic gamma, and exponentiation, blocks 74–80. The film transformed digitized Red, Blue, and Green signals ($r_{in}$, $b_{in}$, $g_{in}$) then go through a series of display related transforms, video cross-talk, display gamma and artistic, blocks 82–86, to generate the corrected digitized Red, Blue, and Green output signals ($r_{out}$, $b_{out}$, $g_{out}$).

For further descriptions of color correctors, see above identified copending applications entitled; Non-Real-Time Film Scanning System, Digital Video Processing System With Mixing Prefilter, Method and Apparatus for Flare Correction, Digitized Film Image Processing System With Bordered Split Screen Display, Digital Color Correction System and Method, Digital Video Color Processor With Anti-Aliasing, and Digital Color Correction System Having Gross and Fine Adjustment Modes.

As described earlier, the CPU of the operator input subsystem of the film to video conversion digital image processing system receives the desired Red, Blue and Green output results from the operator through an input device of the operator input subsystem. Additionally, the CPU receives the digitized Red, Blue, and Green input signal ($r_{in}$, $b_{in}$, $g_{in}$) values, and the gain and offset, interimage masking, film characteristic gamma, and video cross-talk parameters, currently used by the exemplary color corrector, from the control processor of the image signal processing subsystem of the film to video conversion digital image processing system.

In response, the CPU performs the standard non-linear Levenberg-Marquardt optimization to determine the most optimal gain and offset, interimage masking, film characteristic gamma, and video cross-talk parameters to be used by the exemplary color corrector. The CPU makes the determination by repeatedly computing the parameter changes for the parameters until the parameter changes fall below certain predetermined thresholds for the parameters. The CPU then provides the optimal processing parameters to the color corrector. The color corrector in turn uses the optimal processing parameters to correct the digitized Red, Blue and Green input signals.

The direct formulation of the colorimetric transform function is illustrated in Appendix A. The computation of the partial derivatives with respect to the video cross-talk parameters, the film domain characteristic parameters, the film inter-image masking parameters, and the input gain and offsets parameters required for computing the video cross-talk parameter changes, the film domain characteristic parameter changes, the inter-image masking parameter changes and the gain and offset parameter changes are illustrated in Appendix B.

While the present invention has been described in terms of a presently preferred embodiment, those skilled in the art will recognize that the invention is not limited to the embodiment described. The present invention can be practiced with modification and alteration within the spirit and scope of the appended claims. The description is thus to be regarded as illustrative instead of limiting on the present invention.

What is claimed is

1. A method for converting a source image from a first medium to a second medium, said method comprising the following steps:

generating source image signals representative of the source image on the first medium;

displaying a plurality of reference output images associated with the second medium;

selecting a desired one of the reference output images;

generating optimal values for a set of image processing parameters, by performing a Levenberg-Marquardt non-linear optimization on a smoothly differentiable continuous function, the value of the smoothly differentiable continuous function being approximately the desired reference output image, and the source image signals and the image processing parameters being variables of the smoothly differentiable continuous function;

correcting the source image signals so as to closely approximate the desired reference output image, using the optimal values for the image processing parameters;

reconstructing the source image on the second medium using the corrected source image signals.

2. The method as set forth in claim 1, wherein, said source image signals comprise digitized color signals, and wherein said step of correcting said source image signals is performed by a digitized signal color corrector.

3. The method as set forth in claim 2, wherein, said digitized color signals comprise digitized red, blue and green signals.

4. The method as set forth in claim 2, wherein, said processing parameters comprise gain and offset adjustment parameters, said color corrector performing gain and offset adjustments to said digitized color signals.

5. The method as set forth in claim 2, wherein, said processing parameters comprise interimage masking parameters, said color corrector performing interimage masking transforms on said digitized color signals.

6. The method as set forth in claim 2, wherein, said processing parameters are film characteristic gamma parameters, said color corrector performing film characteristic gamma transforms on said digitized color signals.

7. The method as set forth in claim 2, wherein, said processing parameters are video cross-talk parameters, said color corrector performing video cross-talk transforms on said digitized color signals.

8. The method as set forth in claim 1, wherein, said method is a film to video conversion digital image processing method, said first and second medium being film and video respectively.

9. The method as set forth in claim 8, wherein, said film to video conversion digital image processing method is a film to video conversion digital image processing method for HDTV video.

10. A digital image processing system for converting a source image from a first medium onto a second medium, comprising:

image sampling means for generating source image signals representative of the source image on the first medium;

operator input means for displaying a plurality of reference output images associated with the second medium, and for selecting a desired one of said reference output images;

processor means, being coupled to the operator input means and the image sampling means, for generating optimal values for a set of image processing parameters by performing a Levenberg-Marquardt non-linear optimization on a smoothly differentiable continuous function the value of the smoothly differentiable continuous function being approximately the desired reference output image, and the source image signals and the image processing parameters being variables of the smoothly differentiable continuous function;

image signal correction means, being coupled to the image sampling means and the processor means, for generating a corrected version of the source image signals so as to closely approximate the desired reference output image, using the optimal values for the image processing parameters;

image reconstruction means for using the corrected version of the source image signals to reconstruct the source image on a second medium.

11. The digital image processing system as set forth in claim 10, wherein, said source image signals comprise digitized color signals, and said image signal correction means comprise a color corrector.

12. The digital image processing system as set forth in claim 11, wherein, said digitized color signals comprise digitized red, blue and green signals.

13. The digital image processing system as set forth in claim 11, wherein, said processing parameters comprise gain and offset adjustment parameters, said color corrector performing gain and offset adjustments to said digitized color signals.

14. The digital image processing system as set forth in claim 11, wherein, said processing parameters comprise interimage masking parameters, said color corrector performing interimage masking transforms on said digitized color signals.

15. The digital image processing system as set forth in claim 11, wherein, said processing parameters are film characteristic gamma parameters, said color corrector performing film characteristic gamma transforms on said digitized color signals.

16. The digital image processing system as set forth in claim 11, wherein, said processing parameters are video cross-talk parameters, said color corrector performing video cross-talk transforms on said digitized color signals.

17. The digital image processing system as set forth in claim 10, wherein, said digital image processing system is a film to video conversion digital image processing system, said first and second media being film and video respectively.

18. The digital image processing system as set forth in claim 17, wherein, said film to video conversion digital image processing system is a film to video conversion digital image processing system for HDTV video.

* * * * *